US012636737B2

(12) United States Patent (10) Patent No.: US 12,636,737 B2
Shirakawa et al. (45) Date of Patent: May 26, 2026

(54) FLUX-COATED BALL AND METHOD FOR MANUFACTURING SAME

(71) Applicant: SENJU METAL INDUSTRY CO., LTD., Tokyo (JP)

(72) Inventors: Ayaka Shirakawa, Tokyo (JP); Hiroyuki Iwamoto, Tokyo (JP); Shigeki Kondo, Tokyo (JP); Katsuji Nakamura, Tokyo (JP)

(73) Assignee: SENJU METAL INDUSTRY CO., LTD., Tokyo (JP)

( * ) Notice: Subject to any disclaimer, the term of this patent is extended or adjusted under 35 U.S.C. 154(b) by 527 days.

(21) Appl. No.: 18/106,247

(22) Filed: Feb. 6, 2023

(65) Prior Publication Data

US 2023/0249293 A1 Aug. 10, 2023

(30) Foreign Application Priority Data

Feb. 9, 2022 (JP) .................................. 2022-019052

(51) Int. Cl.
*B23K 35/02* (2006.01)
*B23K 3/06* (2006.01)
*B23K 35/30* (2006.01)
*B23K 35/36* (2006.01)

(52) U.S. Cl.
CPC ........ *B23K 35/0244* (2013.01); *B23K 3/0623* (2013.01); *B23K 35/302* (2013.01); *B23K 35/3618* (2013.01)

(58) Field of Classification Search
CPC ............ B23K 35/0244; B23K 35/0623; B23K 35/302; B23K 35/3618; B23K 3/0623
See application file for complete search history.

(56) References Cited

U.S. PATENT DOCUMENTS

| 10,717,157 B2* | 7/2020 | Hattori ...................... B22F 1/18 |
| 2017/0100802 A1 | 4/2017 | Kobayashi et al. |
| 2017/0182601 A1* | 6/2017 | Kawasaki ............ B23K 35/262 |

FOREIGN PATENT DOCUMENTS

| CN | 106029260 A | 10/2016 |
| CN | 106914675 A | 7/2017 |
| CN | 107073656 A | 8/2017 |
| CN | 107097014 A | 8/2017 |
| CN | 109967914 A | 7/2019 |
| JP | 2000317682 A | 11/2000 |
| JP | 2005-254246 | 9/2005 |
| JP | 2007-115857 | 5/2007 |
| JP | 2008-272779 | 11/2008 |
| JP | 2014-008506 | 1/2014 |
| JP | 2017110251 A | 6/2017 |

(Continued)

OTHER PUBLICATIONS

WO 2015114798. Machine translation of the description (Year: 2015).*

(Continued)

*Primary Examiner* — Tima M. McGuthry-Banks
(74) *Attorney, Agent, or Firm* — NIXON PEABODY LLP; Jeffrey L. Costellia

(57) ABSTRACT

The present invention employs a flux-coated ball 100 having a core part 110 and a shell part 120 with which the core part 110 is coated. The flux-coated ball 100 is characterized in that the core part 110 is made of a solder ball or a copper core ball, that the shell part 120 is made of a flux layer containing at least one selected from the group consisting of an activator and a resin component, and that an oxide film thickness in the flux-coated ball 100 is 3 nm or less.

9 Claims, 3 Drawing Sheets

(56)　　　　　References Cited

FOREIGN PATENT DOCUMENTS

| JP | 2017-119291 | | 7/2017 |
|----|-------------|------|--------|
| JP | 2017-170480 | | 9/2017 |
| JP | 2019-072724 | | 5/2019 |
| WO | WO-2015/114798 | | 8/2015 |
| WO | WO-2015/118611 | | 8/2015 |
| WO | 2015178374 | A1 | 11/2015 |
| WO | WO-2016/071971 | | 5/2016 |

OTHER PUBLICATIONS

CN_107097014 A machine translation (Year: 2017).*
JP_2004339583_A machine translation and original document (Year: 2004).*
JP_2022065440_A machine translation and original document (Year: 2022).*
JP_5943136_B1 machine translation and original document (Year: 2016).*
JP_7032687_B1 machine translation and original document (Year: 2022).*
Espacenet family data for U.S. Pat. No. 10,717,157 B2 & CN 107073656 A. (Year: 2017).*
Japanese Notice of Reasons for Rejection for Application No. 2022-019052, mailed Jul. 26, 2022 (8 pages).
Taiwanese Office Action for App. No. 112103073, mailed Oct. 11, 2023 (10 pages).
Notice of Allowance in Chinese Patent Application No. 202310094012.4 with English Translation, dated Nov. 5, 2025, (6 pages).
Office Action in Chinese Patent Application No. CN202310094012.4 with English Translation, mailed Jul. 10, 2025, (24 pages).

* cited by examiner

COMPARATIVE EXAMPLE 1

EXAMPLE 1

FIG. 3

EXAMPLE 4

30μm

EXAMPLE 3

30μm

SOLDER BALL

30μm

EXAMPLE 2

30μm

EXAMPLE 5

30μm

FLUX-COATED BALL AND METHOD FOR MANUFACTURING SAME

BACKGROUND OF THE INVENTION

Field of the Invention

The present invention relates to a flux-coated ball and a method for manufacturing the same. The present invention claims priority on the basis of Japanese Patent Application No. 2022-019052, filed in Japan on Feb. 9, 2022.

Description of Related Art

Solder bump formation methods include a plating method, a paste printing method, a ball mounting method, and the like, each of which has advantages and disadvantages.

Among these methods, the ball mounting method is a method in which a small-sized spherical solder ball is directly mounted on an electrode and made into a bump by reflow, and as compared to other methods, there are advantages such as being able to increase the height of bumps and reduce variations in the height of the bumps. On the other hand, the ball mounting method has a problem of yield improvement because solder balls are required to be mounted over the entire surface of a wafer, making the number of the solder balls extremely large.

In solder bump formation by the ball mounting method, first, flux is applied to electrodes on a wafer through a metal mask. Subsequently, solder balls are mounted in alignment with the electrodes on the wafer onto which flux has been applied. Subsequently, reflow of the wafer on which the solder balls have been mounted is performed to melt the solder balls, thereby forming solder bumps.

In accordance with the development of small-sized information devices, reducing the sizes of electronic components to be mounted thereon is rapidly progressing. As the sizes are being reduced, making connection terminals narrower and making mounting areas smaller are required in the electronic components. In solder bump formation, it is becoming difficult to stably print flux on a narrow pitch pattern.

In this regard, a flux-coated ball in which the surface of a solder ball has been preliminarily coated with flux has been proposed. For example, a flux-coated ball produced by applying liquid flux to the surface of a small-sized spherical solder ball and drying is disclosed (refer to Japanese Unexamined Patent Application, First Publication No. 2017-119291).

SUMMARY OF THE INVENTION

However, the conventional flux-coated balls have a problem in that aggregation is likely to occur when liquid flux is applied to solder balls and dried at the time of the manufacturing. In addition, the conventional flux-coated balls are required to be further improved in terms of wettability with respect to a wafer.

The present invention has been made in view of the above-mentioned circumstances, and an object thereof is to provide a flux-coated ball with improved wettability with respect to a wafer, and a method for manufacturing a flux-coated ball which is a simple method in which aggregation of balls is unlikely to occur.

In order to achieve the above-mentioned object, the present invention employs the following aspects.

[1] A flux-coated ball having: a core part; and a shell part with which the core part is coated, in which the core part is made of a solder ball or a copper core ball, the shell part is made of a flux layer containing at least one selected from the group consisting of an activator and a resin component, and an oxide film thickness is 3 nm or less.

[2] The flux-coated ball according to [1], in which a degree of true sphericity is 0.990 or more.

[3] The flux-coated ball according to [1] or [2], in which a thickness of the flux layer is 0.5 μm or more and 2.5 μm or less.

[4] The flux-coated ball according to any one of [1] to [3], in which a surface roughness (Ra) of the flux layer is 2.0 μm or less.

[5] The flux-coated ball according to any one of [1] to [4], in which the activator includes at least an organic acid.

[6] The flux-coated ball according to [5], in which the organic acid is at least one selected from the group consisting of glutaric acid, diglycolic acid, malonic acid, citric acid, pimelic acid, adipic acid, and 2,2-bis(hydroxymethyl)propionic acid.

[7] The flux-coated ball according to any one of [1] to [6], in which a chord of the entire ball is 30 μm or more and 300 μm or less.

[8] A method for manufacturing a flux-coated ball having a core part which is made of a solder ball or a copper core ball, and having a shell part with which the core part is coated and which is made of a flux layer containing at least one selected from the group consisting of an activator and a resin component, the method including a dry treatment step of shaking and stirring the solder ball or the copper core ball, and a flux material containing at least one selected from the group consisting of the activator and the resin component while heating the solder ball or the copper core ball, and the flux material.

[9] The method for manufacturing a flux-coated ball according to [8], in which, in the dry treatment step, the solder ball or the copper core ball, and the flux material are shaken and stirred while being heated with a ratio (mass ratio) of the solder ball or the copper core ball to the flux material being 1 to 10.

According to the present invention, a flux-coated ball with improved wettability with respect to a wafer, and a method for manufacturing a flux-coated ball which is a simple method in which aggregation of balls is unlikely to occur can be provided.

BRIEF DESCRIPTION OF THE DRAWINGS

FIG. 3 shows photographs of the external appearance of each of flux-coated balls of Examples 2 to 5 and solely a solder ball.

DETAILED DESCRIPTION OF THE INVENTION

Figure 1:
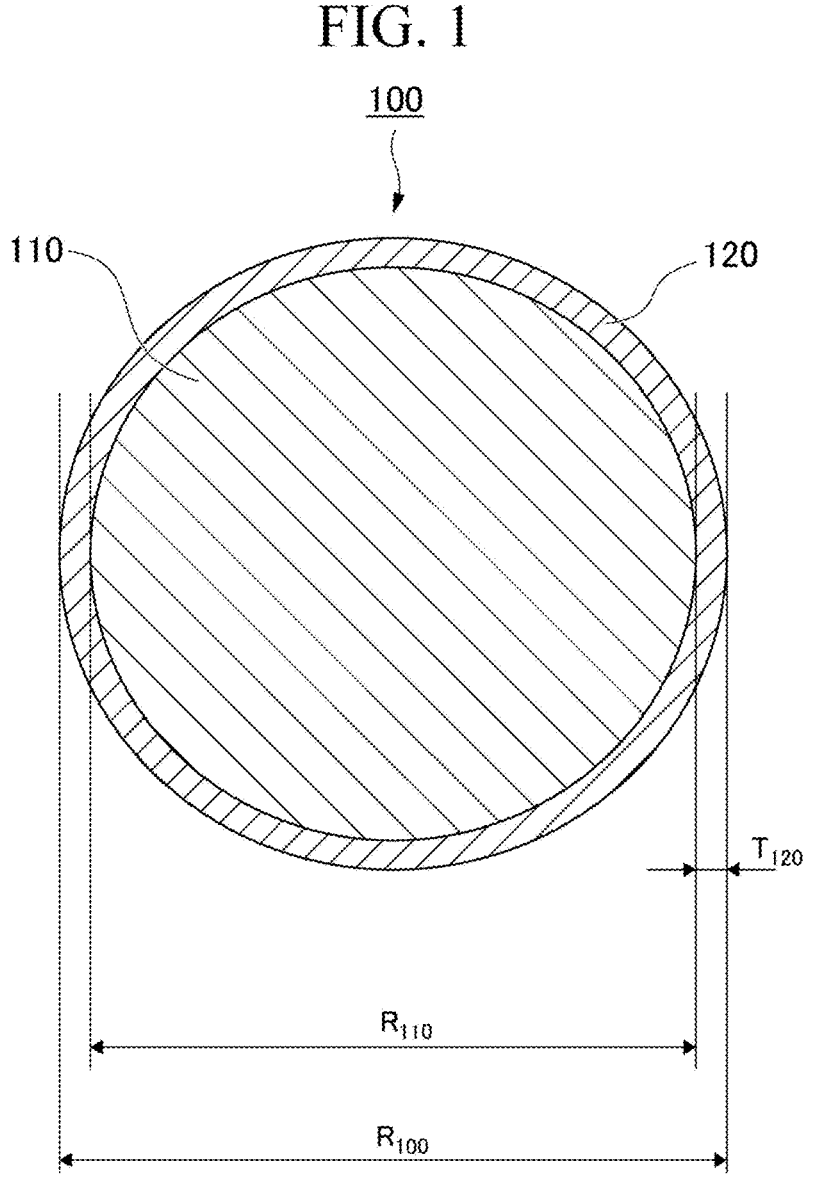
FIG. 1 is a cross-sectional view showing one embodiment of a flux-coated ball.

Hereinafter, a flux-coated ball of the present embodiment will be described in detail with reference to the drawings. In the drawings below, the dimensions and ratios of each constituent element are appropriately changed in order to make the drawings easier to see.

In the embodiment of the present disclosure, dimensional ratios or the like of the components are not limited to those shown in the drawings.

A specific configuration of the embodiment according to the present invention is not limited to the embodiment of the disclosure, and may be changed or substituted without departing from the spirit of the disclosure.

(Flux-Coated Ball)

A flux-coated ball according to one aspect of the present invention has a core part and a shell part with which the core part is coated.

In such a flux-coated ball, the core part is made of a solder ball or a copper core ball. The shell part is made of a flux layer containing at least one selected from the group consisting of an activator and a resin component.

In such a flux-coated ball, an oxide film thickness is 3 nm or less.

First Embodiment

FIG. 1 is a cross-sectional view showing one embodiment of the flux-coated ball.

In FIG. 1, a flux-coated ball 100 has a spherical core part 110 and a shell part 120 with which the entire core part 110 is coated.

Regarding Oxide Film Thickness of Flux-Coated Ball 100

In the present invention, the oxide film thickness of the flux-coated ball means the thickness of an oxide film present on the core part surface, and is a $SiO_2$ equivalent value.

The thickness of the oxide film present on the core part surface (oxide film thickness of the core part surface) is measured as follows.

The flux-coated ball as a measurement sample is subjected to ultrasonic cleaning in acetone for 20 minutes. Subsequently, the surface of the measurement sample after the ultrasonic cleaning is measured by Auger electron spectroscopy.

For example, an Auger electron spectroscopy analysis apparatus (such as PHI700 manufactured by ULVAC-PHI, INCORPORATED) is used as an analysis apparatus. The analysis conditions are set to an acceleration voltage of 10 kV, a current value of 10 nA, and an analysis diameter of 20 μm.

In the flux-coated ball 100, the oxide film thickness of the core part 110 surface is 3 nm or less, preferably 2.5 nm or less, and more preferably 2.0 nm or less.

When the oxide film thickness of the core part 110 surface is equal to or less than the upper limit value of the above-mentioned range, wetting and spreading with respect to a wafer is favorable, thereby improving the wettability.

The smaller the value of the oxide film thickness of the core part 110 surface, the thinner the oxide film, which is preferable. The lower limit value of the oxide film thickness of the core part 110 surface is 0.5 nm, for example.

Regarding Chord of Flux-Coated Ball 100

In the present invention, the chord of the flux-coated ball means the chord of the entire flux-coated ball, that is, the diameter, and corresponds to "$R_{100}$" in FIG. 1.

For example, the chord ($R_{100}$) of the flux-coated ball 100 is 30 μm or more and 300 μm or less, and may be 35 μm or more and 200 μm or less, may be 40 μm or more and 150 μm or less, or may be 45 μm or more and 100 μm or less.

When the chord ($R_{100}$) of the flux-coated ball 100 is in the above-mentioned range, the demand for narrower pitches of a pattern is easily met.

Regarding Degree of True Sphericity of Flux-Coated Ball 100

The degree of true sphericity of the flux-coated ball 100 is 0.990 or more, for example.

When the degree of true sphericity of the flux-coated ball 100 is 0.990 or more, the height of solder bumps is easily adjusted to a more uniform height.

The upper limit of the degree of true sphericity of flux-coated ball 100 is not particularly limited, and may be 0.999, or may be 1.000 based on measurement, for example.

The degree of true sphericity of the flux-coated ball is obtained as follows.

For 500 flux-coated balls as measurement samples, an arithmetic mean value calculated when the diameter thereof is divided by the longest diameter is obtained. The closer the arithmetic mean value is to the upper limit value of 1.000, the closer the shape of the flux-coated ball is to a true sphere.

The length of the longest diameter and the length of the diameter of the measurement samples can be measured by an ULTRA Quick Vision ULTRA QV350-PRO measurement device manufactured by Mitutoyo Corporation, for example.

Regarding Relationship of Mass Ratio in Flux-Coated Ball 100

The content percentage occupied by the core part 110 in the flux-coated ball 100 is 95% by mass or more, and may be 96% by mass or more and 99.8% by mass or less, may be 97% by mass or more and 99.7% by mass or less, or may be 98% by mass or more and 99.6% by mass or less, for example.

The content percentage occupied by the shell part 120 in the flux-coated ball 100 is 5% by mass or less, and may be 0.2% by mass or more and 4% by mass or less, may be 0.3% by mass or more and 3% by mass or less, or may be 0.4% by mass or more and 2% by mass or less, for example.

When the content percentage occupied by the core part 110 and the shell part 120 in the flux-coated ball 100 is in the above-mentioned range, a certain amount of flux is ensured, thereby further improving the wettability with respect to a wafer.

The content percentage occupied by the core part 110 and the shell part 120 in the flux-coated ball 100 can be obtained from the mass before a cleaning treatment and the mass after a drying treatment by performing the cleaning treatment on the flux-coated ball 100 with acetone and thereafter performing the drying treatment.

Surface Roughness of Flux-Coated Ball 100

In the present invention, the surface roughness of the flux-coated ball means the surface roughness (Ra) of the flux layer.

The surface roughness of the flux-coated ball 100, that is, the surface roughness (Ra) of the flux layer 120 is 2.0 μm or less, preferably 1.8 μm or less, and more preferably 1.6 μm or less, for example.

When the surface roughness (Ra) of the flux layer 120 is equal to or less than the upper limit value of the above-mentioned range, the degree of true sphericity of the flux-coated ball 100 is increased.

The lower the surface roughness (Ra) of the flux layer 120, the higher the level of smoothness of the surface of the flux layer 120, which is preferable. The lower limit value of the surface roughness (Ra) of the flux layer 120 is 0.5 μm, for example.

The surface roughness of the flux-coated ball is obtained as follows.

The roughness of the flux-coated ball surface as a measurement sample, that is, the flux layer surface, is measured in a predetermined range with a laser microscope. For example, using a confocal microscope manufactured by Lasertec Corporation, the surface roughnesses (Ra) of arbitrary three flux-coated balls are measured by adjusting the magnification of an objective lens to 50 times with the measurement pitch on a z-axis being set to 0.1 $\mu$m. Then, the arithmetic mean thereof is obtained.

<<Core Part>>

In the flux-coated ball 100, the core part 110 is made of a solder ball or a copper core ball.

The chord (Rio) of the core part 110 is 30 $\mu$m or more and 295 $\mu$m or less, and may be 30 $\mu$m or more and 250 $\mu$m or less, or may be 40 $\mu$m or more and 200 $\mu$m or less, for example.

The chord ($R_{110}$) of the core part 110 means the diameter of the core part 110 and corresponds to the diameter of the solder ball or the copper core ball.

Examples of materials of the solder ball constituting the core part 110 include Sn and a solder alloy containing Sn as a main component. With respect to the total amount of the solder alloy, the Sn content in the solder alloy containing Sn as the main component is 5% by mass or more, and may be 10% by mass or more, or may be 40% by mass or more, for example.

Examples of the solder alloy include Sn—Ag alloys, Sn—Cu alloys, Sn—Ag—Cu alloys, Sn—In alloys, Sn—Pb alloys, Sn—Bi alloys, and Sn—Bi—Ag—Cu alloys.

Any alloying element can be added to the solder alloy. Examples of the alloying element include Ag, Cu, In, Ni, Co, Sb, Ge, P, Fe, and Ga.

Examples of the copper core ball constituting the core part 110 include a ball obtained by subjecting the surface of a copper ball to a plating treatment. The composition of the plating is not particularly limited, and the plating treatment may be performed multiple times with the same or different plating compositions. Examples thereof include a ball obtained by subjecting the surface of a copper ball to a plating treatment with Ni, which is a barrier layer for preventing diffusion, and further subjecting this Ni-plated surface to a plating treatment with a Sn—Ag—Cu alloy.

<<Shell Part>>

In the flux-coated ball 100, the shell part 120 is made of the flux layer containing at least one selected from the group consisting of an activator and a resin component.

The thickness ($T_{120}$) of the flux layer 120 is 0.10 $\mu$m or more and 2.0 $\mu$m or less, and may be 0.15 $\mu$m or more and 1.5 $\mu$m or less, may be 0.20 $\mu$m or more and 1.0 $\mu$m or less, or may be 0.25 $\mu$m or more and 0.80 $\mu$m or less, for example.

When the thickness ($T_{120}$) of the flux layer 120 is equal to or more than the lower limit value of the above-mentioned range, a certain amount of flux is ensured, thereby further improving the wettability with respect to a wafer. On the other hand, when the thickness is equal to or less than the upper limit value of the above-mentioned range, the aggregation of the flux-coated ball 100 is less likely to occur.

The flux layer constituting the shell part 120 contains at least one selected from the group consisting of an activator and a resin component, and may contain components other than them as necessary.

The activator can be appropriately selected according to the characteristics required, and examples thereof include organic acids and amines.

Examples of organic acids include organic carboxylic acids such as aliphatic carboxylic acids and aromatic carboxylic acids, and organic sulfonic acids such as aliphatic sulfonic acids and aromatic sulfonic acids.

Examples of amines include azoles, guanidines, alkylamine compounds, and aminoalcohol compounds.

Examples of the resin component can be appropriately selected according to the characteristics required, and examples thereof include rosin, terpene resin, modified terpene resin, terpene phenol resin, modified terpene phenol resin, styrene resin, modified styrene resin, xylene resin, modified xylene resin, acrylic resin, polyethylene resin, acrylic-polyethylene copolymer resin, and epoxy resin.

Among the above-mentioned examples, the flux layer constituting the shell part 120 preferably contains at least an activator from the viewpoint of inhibiting oxidation of the core part and imparting wettability.

From the viewpoint of coatability with respect to the core part 110, the activator herein preferably contains at least one selected from the group consisting of an organic acid and an amine, and more preferably contains at least an organic acid.

The flux layer constituting the shell part 120 is preferably a layer containing at least an organic acid, and examples thereof include a layer composed of only an organic acid, a layer containing an organic acid and a resin component, a layer containing an organic acid and an amine, and a layer containing an organic acid, a resin component, and an amine.

The organic acid herein is preferably an organic carboxylic acid, is more preferably an aliphatic carboxylic acid, and is particularly preferably at least one selected from the group consisting of glutaric acid, diglycolic acid, malonic acid, citric acid, pimelic acid, adipic acid, and 2,2-bis (hydroxymethyl)propionic acid.

For the components contained in the flux layer, one type may be used alone, or two or more types may be used.

For example, the content of the activator in the flux layer is 10% by mass or more and 100% by mass or less with respect to the entire flux layer.

For example, the content of the resin component in the flux layer is 0% by mass or more and 90% by mass or less with respect to the entire flux layer.

The flux layer constituting the shell part 120 may contain components (optional components) other than the activator and the resin component.

Examples of the optional components include antioxidants and colorants.

According to the first embodiment described above, the flux-coated ball 100 with improved wettability with respect to a wafer can be provided.

The flux-coated ball 100 according to the first embodiment has the core part 110 and the shell part 120 with which the core part 110 is coated. The core part 110 is made of the solder ball or the copper core ball and electrically connects electrodes on a wafer and electrodes on a semiconductor package. The shell part 120 is made of the flux layer containing at least one selected from the group consisting of an activator and a resin component, and aims for improvement of the wettability between the core part 110 and an electrode by removing the oxide film on the core part 110 surface and the metal oxide film on the electrode surface at the time of reflow.

In the flux-coated ball 100 according to the first embodiment, the oxide film thickness (that is, the thickness of the oxide film present on the core part surface) is 3 nm or less. The oxide film thickness of 3 nm or less is approximately the same as the oxide film thickness of solely the solder ball or copper core ball constituting the core part. Since the oxide film thickness is controlled to be thin as described above, according to the flux-coated ball 100, the wettability with respect to a wafer is improved.

OTHER EMBODIMENTS

In the above-mentioned first embodiment, the constitution in which the shell part 120 with which the core part 110 is coated is made of a single flux layer has been described, but the constitution is not limited to this constitution, and an embodiment in which the shell part with which the core part 110 is coated is made of multiple flux layers may be also employed. According to this embodiment, different effects can be imparted to each layer of the multiple flux layers.

In the flux-coated ball 100 according to the above-mentioned first embodiment, the content in which the entire core part 110 is coated with the shell part 120 has been described, but the content is not limited to this content described, and an embodiment in which the core part 110 is partially coated with the shell part 120 may also be employed. For example, an embodiment provided with the shell part with which the core part 110 is partially coated such that the shell part is brought into contact with at least an electrode on a wafer when the flux-coated ball is directly mounted on the electrode may also be employed.

The flux-coated ball according to one aspect of the present invention is useful for solder bump formation by a ball mounting method. According to such a flux-coated ball, flux can be stably supplied onto a narrow pitch pattern in solder bump formation.

(Method for Manufacturing Flux-Coated Ball)

A method for manufacturing a flux-coated ball according to one aspect of the present invention is a method for manufacturing a flux-coated ball which has a core part made of a solder ball or a copper core ball, and has a shell part with which the core part is coated and which is made of a flux layer containing at least one selected from the group consisting of an activator and a resin component.

Such a method for manufacturing a flux-coated ball includes a dry treatment step of shaking and stirring solder balls or copper core balls, and a flux material containing at least one selected from the group consisting of an activator and a resin component while heating the solder balls or the copper core balls, and the flux material.

The flux-coated ball 100 of the above-mentioned embodiment can be manufactured using the method for manufacturing a flux-coated ball according to one aspect described above.

The ball chord (diameter) of the solder ball or the copper core ball used in the core part 110 is 30 μm or more and 295 μm or less, and may be 30 μm or more and 250 μm or less, or may be 40 μm or more and 200 μm or less, for example.

Examples of the solder ball or the copper core ball used for the core part 110 include the examples described in the explanation of <<Core part>> described above.

For the flux material, a powdery flux material can be used, for example. As the powdery flux material, it is preferable to use a powdery material having a 50% particle size of 100 μm or more and 1000 μm or less when a cumulative curve is obtained with the total volume of the aggregation of this powder being 100%.

Examples of the flux material include the examples described in the explanation of the organic acids, amines, and resin components described above.

<Dry Treatment Step>

In the dry treatment step, the solder balls or the copper core balls, and the flux material containing at least one selected from the group consisting of an activator and a resin component are shaken and stirred while being heated.

The mixing ratio of the solder balls or the copper core balls, and the flux material may be appropriately adjusted according to the desired thickness of the flux layer and the desired ball chord of the solder balls or the copper core balls.

For example, when the ball chord is 30 μm or more and 100 μm or less, the ratio (mass ratio) of the above-mentioned solder balls or copper core balls to the above-mentioned flux material is preferably ball/flux material=1 to 10, more preferably 1.5 to 7.5, and further preferably 2 to 6.

When such a mass ratio is equal to or more than the lower limit value of the above-mentioned preferable range, the entire ball can be easily coated with the flux material, whereas when such a mass ratio is equal to or less than the upper limit value of the above-mentioned preferable range, the flux layer can be prevented from becoming excessively thick.

The temperature conditions for heating in the dry treatment step are preferably set according to the melting point of the flux material. When the heating temperature is too high, there is a risk that the ball may be stuck to the inner wall of a container in which shaking and stirring is performed, whereas when the heating temperature is too low, the coating of the ball surface with the flux material may be insufficient.

Such temperature conditions for heating are preferably equal to or higher than a temperature=the melting point of the flux material minus 35° C., and equal to or lower than a temperature=the melting point of the flux material minus 5° C., and are more preferably equal to or higher than a temperature=the melting point of the flux material minus 25° C., and equal to or lower than a temperature=the melting point of the flux material minus 10° C.

The operation of shaking and stirring in the dry treatment step is preferably performed while heating under the above-mentioned temperature conditions. Alternatively, it is preferable to perform preheating before the operation of shaking and stirring, and thereafter perform the operation of shaking and stirring. Preheating can be performed under the same temperature conditions as the above-mentioned temperature conditions for heating, for example.

In the operation of shaking and stirring in the dry treatment step, an arbitrary container such as a centrifuge tube is charged with the flux material, and the solder balls or the copper core balls. Thereafter, while performing heating at a temperature suitable for the flux material used, the container is shaken and stirred at a predetermined number of strokes.

Each of the number of strokes and the stirring time may be appropriately adjusted. The number of strokes is preferably 500 spin (strokes per minute) or more and 4000 spm or less, and is more preferably 1500 spm or more and 2500 spm or less. The stirring time is preferably 10 minutes or longer and 120 minutes or shorter, and is more preferably 30 minutes or longer and 90 minutes or shorter.

According to the method for manufacturing a flux-coated ball according to one aspect described above, since the dry technique is employed, aggregation of balls is unlikely to occur even after the operation of shaking and stirring while heating, thereby making it possible to manufacture the flux-coated balls in a favorable dispersion state.

In addition, such a method for manufacturing a flux-coated ball is a simple method because only an operation of shaking and stirring solid materials is required, and an operation such as solvent removal in a wet technique is not required.

Since the method for manufacturing a flux-coated ball employs the dry technique, controlling the oxide film thickness (thickness of the oxide film present on the core part surface) to be thin is easy, thereby making it possible to stably manufacture the flux-coated ball with improved wettability with respect to a wafer.

In addition, in such a method for manufacturing a flux-coated ball, since the operation of shaking and stirring is employed, controlling the thickness of the flux layer constituting the shell part to be uniform is easy, thereby easily increasing the degree of true sphericity and easily aiming for improvement of performance as a ball.

Although the above-mentioned method for manufacturing a flux-coated ball according to one aspect has been described as the manufacturing method including the dry treatment step, embodiments are not limited to this embodiment, and an embodiment further including an optional step in addition to the dry treatment step may also be employed. Examples of the optional step include a step of further forming a second flux layer on the first flux layer constituting the shell part 120. According to this embodiment, a flux-coated ball in which the shell part 120 with which the core part 110 is coated is made of multiple flux layers can be manufactured.

EXAMPLES

Hereinafter, the present invention will be described with reference to examples, but the present invention is not limited to the following examples.

In the present example, each of materials for the core part and the shell part used in the manufacture of the flux-coated ball is described.

Spherical metal balls described below were used as the material for the core part.

Solder ball (C-1): a solder ball made of an alloy of 99.3% by mass of Sn and 0.7% by mass of Cu and having a chord $(R_{110})$ of 63 μm.

Solder ball (C-2): a solder ball made of an alloy of 96.5% by mass of Sn, 3.0% by mass of Ag, and 0.5% by mass of Cu, and having a chord $(R_{110})$ of 100 μm.

Solder ball (C-3): a solder ball made of an alloy of 43% by mass of Sn and 57% by mass of Bi and having a chord $(R_{110})$ of 100 μm.

Copper core ball (C-4): a copper core ball in which the copper ball surface was subjected to a plating treatment with Sn-3Ag-0.5Cu and which had a chord $(R_{110})$ of 220 μm.

Solder ball (C-5): a solder ball made of an alloy of 96.5% by mass of Sn, 3.0% by mass of Ag, and 0.5% by mass of Cu, and having a chord $(R_{110})$ of 300 μm.

Solder ball (C-6): a solder ball made of an alloy of 99.3% by mass of Sn and 0.7% by mass of Cu and having a chord $(R_{110})$ of 44 μm.

Flux materials described below were used as the material for the shell part.

Flux material (S-1): glutaric acid (melting point 95° C.), a 50% particle size of 314 μm.

Flux material (S-2): diglycolic acid (melting point 144° C.), a 50% particle size of 335 μm.

Flux material (S-3): malonic acid (melting point 135° C.), a 50% particle size of 362 μm.

Flux material (S-4): citric acid (melting point 153° C.), a 50% particle size of 288 μm.

Flux material (S-5): pimelic acid (melting point 106° C.), a 50% particle size of 254 μm.

Flux material (S-6): adipic acid (melting point 152° C.), a 50% particle size of 325 μm.

Manufacture of Flux-Coated Balls (1)

Example 1

A cylindrical centrifuge tube (4 cm in diameter and 12 cm in length) was charged with 1.2 g of the powdery flux material (S-1) having a 50% particle size of 314 μm when a cumulative curve was calculated with the total volume being 100%, and 6 g of the solder balls (C-1), and the centrifuge tube was sealed.

Subsequently, the centrifuge tube charged with the flux material (S-1) and the solder balls (C-1) was preheated at a temperature of 75° C. for 5 minutes. The temperature condition for preheating was set to a temperature=the melting point of the flux material (S-1) minus 20° C.

Subsequently, while heating the above-mentioned preheated centrifuge tube to a temperature of 75° C., the operation of shaking and stirring in the major axis direction of the above-mentioned centrifuge tube was continued for 60 minutes. The temperature condition for heating herein was set to a temperature=the melting point of the flux material (S-1) minus 20° C., as in the temperature condition for preheating. In addition, the operation of shaking and stirring was performed at 2000 spm (strokes per minute).

Subsequently, after shaking and stirring, cooling to room temperature (23° C.) was performed, thereby obtaining flux-coated balls having a core part made of the solder ball (C-1), and having a shell part which was made of the layer of glutaric acid (flux layer) and with which the entire core part was coated.

Comparative Example 1

The flux material (S-1) was dissolved in acetone to prepare a solution having a glutaric acid concentration of 100 g/L.

Subsequently, 6 g of the solder balls (C-1) were immersed in the above-mentioned solution and stirred at room temperature (23° C.) for 1 hour.

Subsequently, the stirred solder balls (C-1) were taken out from the above-mentioned solution and dried to remove the acetone by volatilization, thereby obtaining flux-coated balls having a core part made of the solder ball (C-1), and having a shell part which was made of the layer of glutaric acid (flux layer) and with which the entire core part was coated.

<Evaluation (1)>

Regarding the flux-coated balls of Example 1 and the flux-coated balls of Comparative Example 1 which were obtained above, the external appearance, the chord $(R_{100})$ of the flux-coated ball and the standard deviation thereof, the degree of true sphericity of the flux-coated ball and the standard deviation thereof, the thickness $(T_{120})$ of the flux layer, the content percentage occupied by the shell part in the flux-coated ball, the oxide film thickness of the flux-coated ball, the surface roughness (Ra) of the flux layer, the level of difficulty in peeling off the flux layer, the wettability of the flux-coated ball, and the dispersion state of the balls immediately after manufacture were each evaluated.

Details of each evaluation are described below.

[External Appearance]

Figure 2:
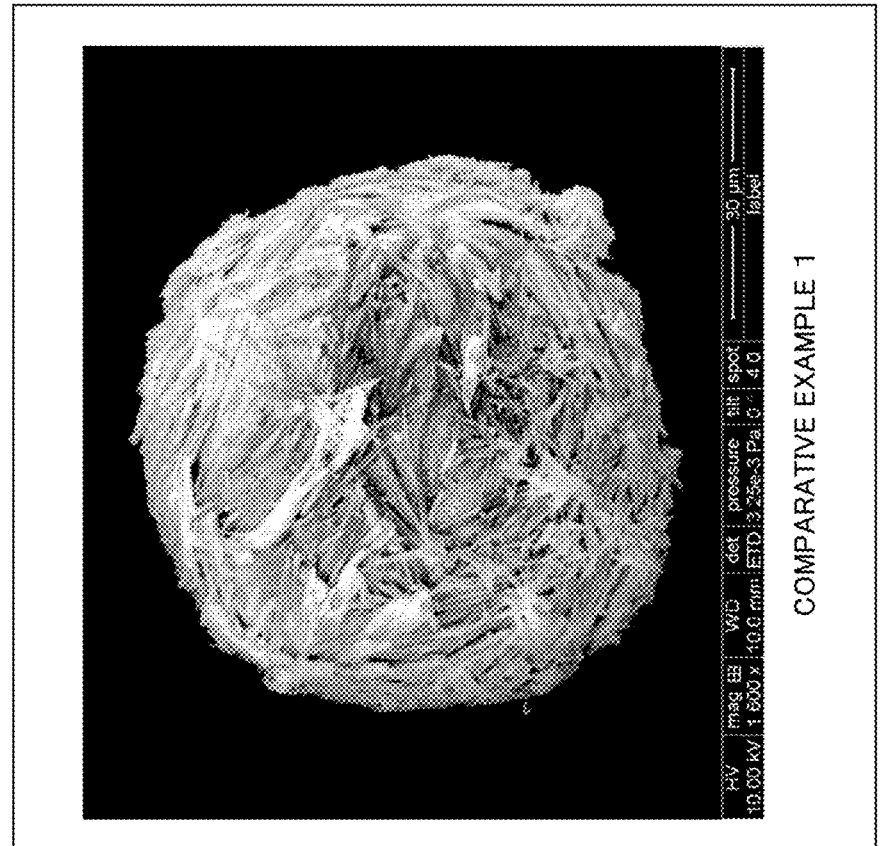
FIG. 2 shows photographs of the external appearance of a flux-coated ball of Example 1 and a flux-coated ball of Comparative Example 1.
Figure 2:
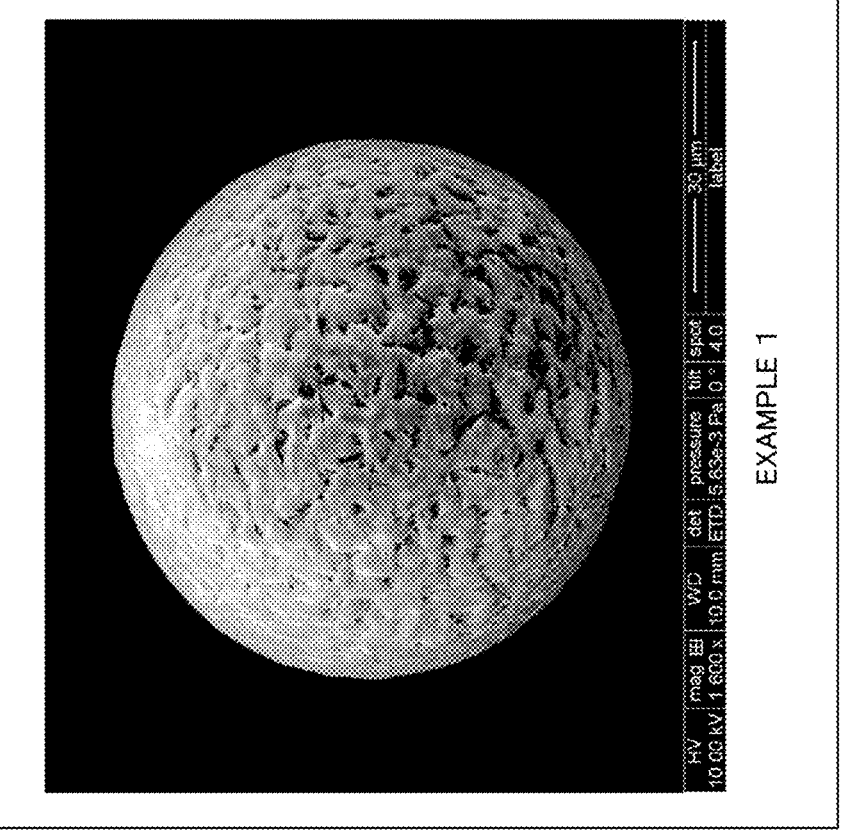

FIG. 2 shows photographs of the external appearance of the flux-coated ball of Example 1 and the flux-coated ball of Comparative Example 1.

It was confirmed from FIG. 2 that in both of the flux-coated balls of Example 1 and Comparative Example 1, the entire solder ball (C-1) as the core part was coated with the layer of glutaric acid (flux layer).

It was confirmed that the surface of the flux-coated ball of Example 1 had a higher level of smoothness than the surface of the flux-coated ball of Comparative Example 1.

[Chord ($R_{100}$) and Degree of True Sphericity of Flux-Coated Ball]

The chord ($R_{100}$) and the degree of true sphericity of the flux-coated balls were measured using a CNC image measurement system. Specifically, an ULTRA Quick Vision ULTRA QV350-PRO measurement device manufactured by Mitutoyo Corporation was used.

Using this measurement device, the length of the longest diameter and the length of the diameter of the flux-coated balls were each measured to calculate the arithmetic mean value of the values obtained by dividing the diameter of each of 500 flux-coated balls by the longest diameter, thereby obtaining the degree of true sphericity. The closer the value is to 1.000, which is the upper limit, the closer it is to a true sphere. In addition, the chord ($R_{100}$) was obtained by calculating the arithmetic mean value of the diameters of each of the 500 flux-coated balls.

Table 1 shows the chord ($R_{100}$) of the flux-coated ball and the standard deviation thereof, and the degree of true sphericity of the flux-coated balls and the standard deviation thereof, all of which were obtained as described above.

[Thickness ($T_{120}$) of Flux Layer]

The thickness ($T_{120}$) of the flux layer was obtained by subtracting the chord ($R_{110}$) 63 µm of the solder ball (C-1) from the chord ($R_{100}$) of the flux-coated ball which was obtained above, and thereafter dividing the result by 2 (calculating the thickness of the layer on one side). The results are shown in Table 1.

[Content Percentage Occupied by Shell Part in Flux-Coated Ball]

The content percentage occupied by the shell part in the flux-coated ball was obtained from the mass before a cleaning treatment and the mass after a drying treatment by performing the cleaning treatment on the flux-coated balls with acetone and thereafter performing the drying treatment. The results are shown in Table 1.

The cleaning treatment with acetone was performed by immersing the flux-coated balls in acetone at room temperature (23° C.) for 30 minutes. The drying treatment was performed at room temperature.

Content of shell part=mass of flux-coated ball before cleaning treatment−mass thereof after drying treatment Content percentage of shell part (% by mass)=content of shell part/mass of flux-coated ball before cleaning treatment×100

[Oxide Film Thickness of Flux-Coated Ball]

The oxide film thickness of the flux-coated ball was obtained by measuring the thickness of the oxide film present on the core part surface (oxide film thickness of the core part surface) as follows.

The flux-coated ball as a measurement sample was subjected to ultrasonic cleaning in acetone for 20 minutes. Subsequently, using an Auger electron spectroscopy analysis apparatus (PH1700 manufactured by ULVAC-PHI, INCORPORATED) as an analysis apparatus, the measurement sample surface after the ultrasonic cleaning was measured under the following analysis conditions to obtain the oxide film thickness. This oxide film thickness is an $SiO_2$ equivalent value. The results are shown in Table 1. Analysis conditions were set to an acceleration voltage of 10 kV, a current value of 10 nA, and an analysis diameter of 20 km.

[Surface Roughness (Ra) of Flux Layer]

The surface roughness of the flux-coated ball, that is, the surface roughness (Ra) of the flux layer, was obtained by measuring as follows.

The surface of the flux-coated ball as a measurement sample, that is, the surface of the flux layer, was measured with a confocal microscope (model name: OPTELICS C130, manufactured by Lasertec Corporation). The surface roughnesses (Ra) of arbitrary three flux-coated balls were measured by adjusting the magnification of an objective lens to 50 times with the measurement pitch on a z-axis being set to 0.1 µm, and the arithmetic mean thereof was taken as the true arithmetic mean roughness, thereby obtaining the surface roughness (Ra) of the flux layer. The results are shown in Table 1.

[Level of Difficulty in Peeling Off Flux Layer]

For the flux-coated balls of each of the examples, the level of difficulty in peeling off the flux layer was evaluated by the following test method. The results are shown in Table 1.

Test method (1): a cylindrical centrifuge tube (4 cm in diameter and 12 cm in length) was charged with 5 g of the flux-coated balls and sealed. Subsequently, the operation of shaking and stirring the above-mentioned centrifuge tube charged with the flux-coated balls in the major axis direction of the centrifuge tube was continued at room temperature (23° C.) for 60 minutes. The surface state of the flux-coated balls after the operation of shaking and stirring was observed under a microscope.

Test method (2): a cylindrical centrifuge tube (4 cm in diameter and 12 cm in length) was charged with 100 flux-coated balls, and 100 solder balls (solder balls made of an alloy of 96.5% by mass of Sn, 3.0% by mass of Ag, and 0.5% by mass of Cu, and having a diameter of 0.6 mm), and the centrifuge tube was sealed. Subsequently, the operation of shaking and stirring the above-mentioned centrifuge tube charged with these balls in the major axis direction of the centrifuge tube was continued at room temperature (23° C.) for 60 minutes. The surface state of the flux-coated balls after the operation of shaking and stirring was observed under a microscope.

[Wettability of Flux-Coated Ball]

For the flux-coated balls of each of the examples, the wettability of the flux-coated balls was evaluated by the following FC ball wetting and spreading test. The results are shown in Table 1.

In the FC ball wetting and spreading test in the present evaluation, a baked copper plate was placed on a hot plate at 150° C. for 1 hour, and the flux-coated balls were mounted on this copper plate to perform reflow a nitrogen atmosphere. The reflow conditions were set to a peak temperature of 250° C. and a temperature rising rate of 1° C./sec. After the reflow, the chord of the ball in a wet and spread state (ball spread chord) was measured. This measurement was performed on 10 flux-coated balls, and the average value thereof was obtained.

The larger the chord of the ball in the wet and spread state (ball spread chord), the better the wettability.

[Dispersion State of Balls Immediately after Manufacture]

Regarding the dispersion state of the balls immediately after manufacture, in the case of Example 1, the dispersion state of the flux-coated balls after the operation of shaking and stirring was evaluated. In the case of Comparative Example 1, the dispersion state of the flux-coated balls after removing acetone by volatilization was evaluated. The results are shown in Table 1.

TABLE 1

| | | Example 1 | Comparative Example 1 |
|---|---|---|---|
| Core part | Ball | Solder ball (C-1) | Solder ball (C-1) |
| | Chord ($R_{110}$) | 63 μm | 63 μm |
| Shell part | Flux material (melting point) | Glutaric acid (95° C.) | Glutaric acid (95° C.) |
| Manufacturing technique | — | Dry technique | Wet technique |
| Chord ($R_{100}$) of flux-coated ball | μm | 63.5 | 68.0 |
| Standard deviation of chord ($R_{100}$) | μm | 0.00019 | 0.00676 |
| Degree of true sphericity of flux-coated ball | — | 0.991 | 0.983 |
| Standard deviation of degree of true sphericity | — | 0.00195 | 0.01150 |
| Thickness ($T_{120}$) of flux layer | μm | 0.25 | 2.50 |
| Content percentage occupied by shell part in flux-coated ball | % by mass | 0.47 | 4.79 |
| Oxide film thickness of flux-coated ball | nm | 1.9 | 8.7 |
| Surface roughness (Ra) of flux layer | μm | 1.583 | 5.804 |
| Level of difficulty in peeling off flux layer (test method ((1)) | — | No peeling was recognized | No peeling was recognized |
| Level of difficulty in peeling off flux layer (test method ((2)) | — | No peeling was recognized | No peeling was recognized |
| Wettability of the flux-coated ball (ball spread chord) | μm | 129.9 | 125.9 |
| Dispersion state of balls immediately after manufacture | — | No aggregation | Aggregation occurred |

From the results shown in Table 1, it was confirmed that as compared to the flux-coated balls of Comparative Example 1, a value of the ball spread chord was larger in the flux-coated balls of Example 1 to which the present invention had been applied, showing that the wettability with respect to the copper plate was further improved.

In addition, in the manufacture of the flux-coated balls of Example 1, the balls did not aggregate immediately after the manufacture. On the other hand, in the manufacture of the flux-coated balls of Comparative Example 1, some of the balls aggregated immediately after the manufacture.

In addition, the flux-coated balls of Example 1 were manufactured by shaking and stirring the powdery flux material (S-1) and the solder balls (C-1) in the sealed container while heating the powdery flux material and the solder balls. As described above, it was also confirmed that the flux-coated balls of Example 1 can be manufactured by the dry treatment which is a simpler method than a wet treatment.

Manufacture of Flux-Coated Balls (2)

Examples 2 to 4

Flux-coated balls of Examples 2 to 4 were each obtained in the same manner as in the method for manufacturing a flux-coated ball of Example 1 except that the flux material (S-1) was changed to each of the flux material (S-2), the flux material (S-3), and the flux material (S-4).

In all of the examples, the temperature condition for preheating and the temperature condition for heating at the time of shaking and stirring were set to a temperature=the melting point of the flux material minus 20° C. That is, the temperature was set to 124° C. in Example 2, 115° C. in Example 3, and 133° C. in Example 4.

The operation of shaking and stirring was performed in the same manner as in Example 1 in all of the examples.

Example 5

Flux-coated balls of Example 5 were obtained in the same manner as in the method for manufacturing a flux-coated ball of Example 1 except that the solder ball (C-1) was changed to the solder ball (C-6), and that the flux material (S-1) was changed to the flux material (S-5).

The temperature condition for preheating and the temperature condition for heating at the time of shaking and stirring were set to a temperature=the melting point of pimelic acid as the flux material minus 20° C., that is, 86° C. in Example 5. The operation of shaking and stirring was performed in the same manner as in Example 1.

Example 6

A cylindrical centrifuge tube (4 cm in diameter and 12 cm in length) was charged with 1.2 g of the powdery flux material (S-1) having a 50% particle size of 314 μm when a cumulative curve was calculated with the total volume being 100%, and 6 g of the solder balls (C-2), and the centrifuge tube was sealed.

Subsequently, the centrifuge tube charged with the flux material (S-1) and the solder balls (C-2) was preheated at a temperature of 132° C. for 5 minutes. The temperature condition for preheating was set to a temperature=the melting point of the flux material (S-1) minus 20° C.

Subsequently, the operation of shaking and stirring the above-mentioned preheated centrifuge tube in the major axis direction of the centrifuge tube was continued at a temperature of 132° C. for 60 minutes. The temperature condition for heating herein was set to a temperature=the melting point of the flux material (S-1) minus 20° C., as in the temperature condition for preheating. In addition, the operation of shaking and stirring was performed at 2000 spm.

Subsequently, after the operation of shaking and stirring, cooling to room temperature (23° C.) was performed, thereby obtaining flux-coated balls having a core part made of the solder ball (C-2), and having a shell part which was made of the layer of glutaric acid (flux layer) and with which the entire core part was coated.

Example 7

Flux-coated balls of Example 7 were obtained in the same manner as in the method for manufacturing a flux-coated ball of Example 6 except that the flux material (S-1) was changed to the flux material (S-6).

The temperature condition for preheating and the temperature condition for heating at the time of shaking and stirring were set to a temperature=the melting point of adipic acid as the flux material minus 20° C., that is, 165° C. in Example 7. The operation of shaking and stirring was performed in the same manner as in Example 6.

Examples 8 to 10

Flux-coated balls of Examples 8 to 10 were obtained in the same manner as in the method for manufacturing a flux-coated ball of Example 1 except that the solder ball (C-1) was changed to each of the solder ball (C-3), the solder ball (C-4), and the solder ball (C-5).

In all of the examples, the temperature condition for preheating and the temperature condition for heating at the time of shaking and stirring were set to a temperature=the melting point of glutaric acid as the flux material minus 20° C., that is, 75° C. in all of Example 8 to 10. The operation of shaking and stirring was performed in the same manner as in Example 1 in all of the examples.

Example 11

Flux-coated balls of Example 11 were obtained in the same manner as in the method for manufacturing a flux-coated ball of Example 1 except that the solder ball (C-1) was changed to the solder ball (C-2), and that the charging amount of the powdery flux material (S-1) having a 50% particle size of 314 µm when the cumulative curve was obtained with the total volume as 100% was changed to 3 g.

The temperature condition for preheating and the temperature condition for heating at the time of shaking and stirring were set to a temperature=the melting point of glutaric acid as the flux material minus 20° C., that is, 75° C. in Example 11. The operation of shaking and stirring was performed in the same manner as in Example 1.

Example 12

Flux-coated balls of Example 12 were obtained in the same manner as in the method for manufacturing a flux-coated ball of Example 1 except that the solder ball (C-1) was changed to the solder ball (C-2), and that the charging amount of the powdery flux material (S-1) having a 50% particle size of 314 µm when the cumulative curve was obtained with the total volume as 100% was changed to 10 g.

The temperature condition for preheating and the temperature condition for heating at the time of shaking and stirring were set to a temperature=the melting point of glutaric acid as the flux material minus 20° C., that is, 75° C. in Example 12. The operation of shaking and stirring was performed in the same manner as in Example 1.

<Evaluation (2)>

Regarding the flux-coated balls of Examples 2 to 12 which were obtained above, the external appearance, the chord (Rico) of the flux-coated ball and the standard deviation thereof, the degree of true sphericity of the flux-coated ball and the standard deviation thereof, the thickness ($T_{120}$) of the flux layer, the content percentage occupied by the shell part in the flux-coated ball, the oxide film thickness of the flux-coated ball, the surface roughness (Ra) of the flux layer, the level of difficulty in peeling off the flux layer, the wettability of the flux-coated ball, and the dispersion state of the balls immediately after manufacture were each evaluated.

The details of each evaluation are the same as those described in the above-mentioned <Evaluation (1)>. These results are shown in FIG. 3 and Tables 2 to 4.

[External Appearance]

Figure 3:
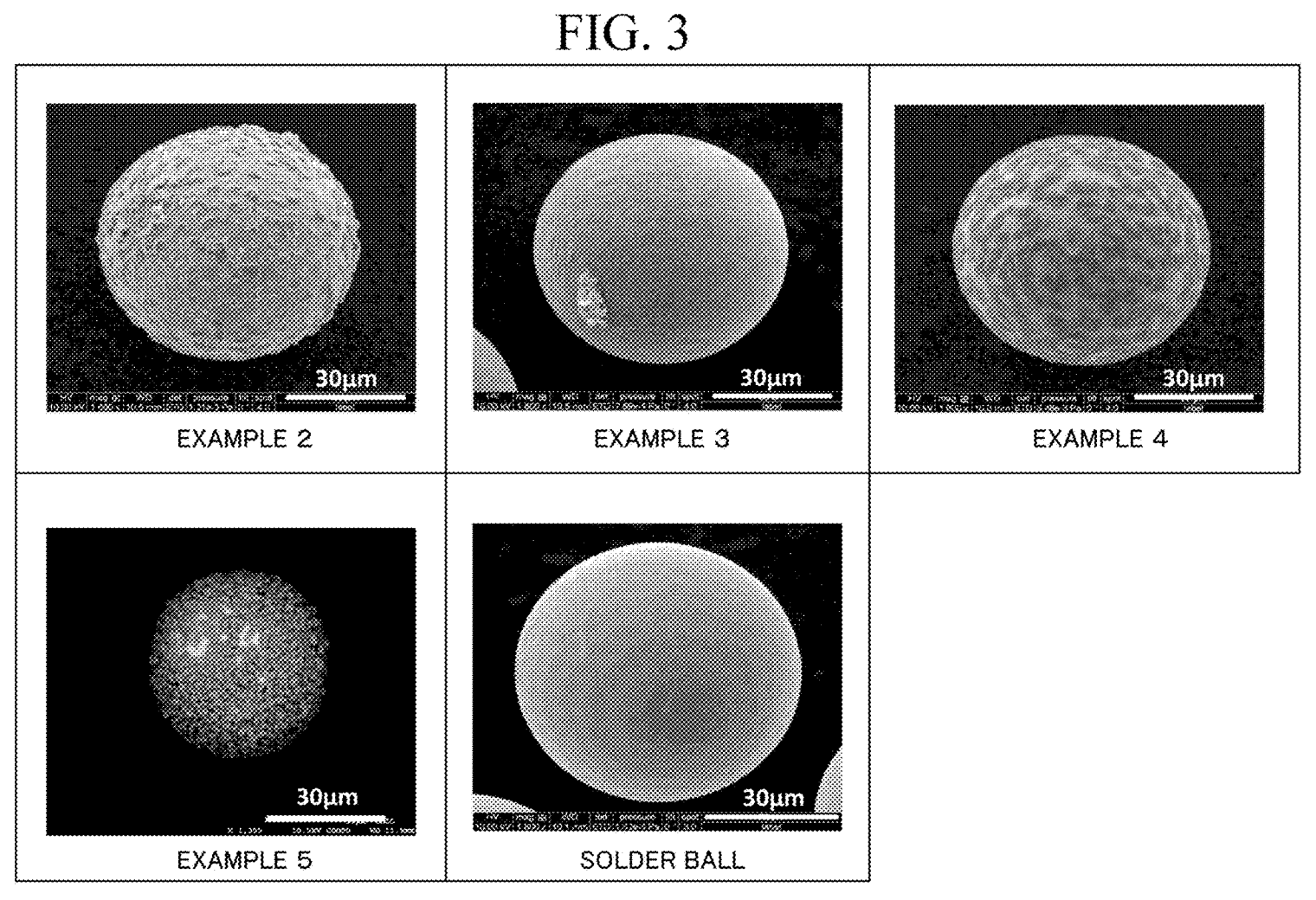

FIG. 3 shows photographs of the external appearance of each of the flux-coated balls of Examples 2 to 5 and solely a solder ball.

From FIG. 3, it can be confirmed that by optimizing the temperature condition of heating in the dry treatment step of shaking and stirring, the metal ball as the core part can be coated with various flux materials.

TABLE 2

| | | Example 2 | Example 3 | Example 4 | Example 5 |
|---|---|---|---|---|---|
| Core part | Ball Chord ($R_{110}$) | Solder ball (C-1) 63 µm | Solder ball (C-1) 63 µm | Solder ball (C-1) 63 µm | Solder ball (C-6) 44 µm |
| Shell part | Flux material (melting point) | Diglycolic acid (144° C.) | Malonic acid (135° C.) | Citric acid (153° C.) | Pimelic acid (106° C.) |
| Manufacturing technique | — | Dry technique | Dry technique | Dry technique | Dry technique |
| Chord ($R_{100}$) of flux-coated ball | µm | 63.6 | 63.4 | 63.6 | 45.6 |
| Standard deviation of chord ($R_{100}$) | µm | 0.00022 | 0.00017 | 0.00024 | 0.00020 |
| Degree of true sphericity of flux-coated ball | — | 0.992 | 0.991 | 0.995 | 0.990 |
| Standard deviation of degree of true sphericity | — | 0.00188 | 0.00202 | 0.00192 | 0.00221 |
| Thickness ($T_{120}$) of flux layer | µm | 0.30 | 0.20 | 0.30 | 0.80 |
| Content percentage occupied by shell part in flux-coated ball | % by mass | 0.58 | 0.42 | 0.65 | 1.35 |
| Oxide film thickness of flux-coated ball | nm | 1.3 | 1.5 | 1.9 | 1.4 |
| Surface roughness (Ra) of flux layer | µm | 1.592 | 1.455 | 1.503 | 1.744 |

TABLE 2-continued

|  |  | Example 2 | Example 3 | Example 4 | Example 5 |
|---|---|---|---|---|---|
| Level of difficulty in peeling off flux layer (test method ((1)) | — | No peeling was recognized | No peeling was recognized | No peeling was recognized | No peeling was recognized |
| Level of difficulty in peeling off flux layer (test method ((2)) | — | No peeling was recognized | No peeling was recognized | No peeling was recognized | No peeling was recognized |
| Wettability of the flux-coated ball (ball spread chord) | μm | 118.5 | 120.4 | 119.4 | 118.8 |
| Dispersion state of balls immediately after manufacture | — | No aggregation | No aggregation | No aggregation | No aggregation |

TABLE 3

|  |  | Example 6 | Example 7 | Example 8 | Example 9 |
|---|---|---|---|---|---|
| Core part | Ball Chord ($R_{110}$) | Solder ball (C-2) 100 μm | Solder ball (C-2) 100 μm | Solder ball (C-3) 100 μm | Copper core ball (C-4) 220 μm |
| Shell part | Flux material (melting point) | Glutaric acid (95° C.) | Adipic acid (185° C.) | Glutaric acid (95° C.) | Glutaric acid (95° C.) |
| Manufacturing technique | — | Dry technique | Dry technique | Dry technique | Dry technique |
| Chord ($R_{100}$) of flux-coated ball | μm | 101 | 101 | 101 | 221 |
| Standard deviation of chord ($R_{100}$) | μm | 0.00025 | 0.00027 | 0.00033 | 0.00022 |
| Degree of true sphericity of flux-coated ball | — | 0.990 | 0.992 | 0.991 | 0.991 |
| Standard deviation of degree of true sphericity | — | 0.00181 | 0.00196 | 0.00188 | 0.00195 |
| Thickness ($T_{120}$) of flux layer | μm | 0.43 | 0.30 | 0.35 | 0.60 |
| Content percentage occupied by shell part in flux-coated ball | % by mass | 0.47 | 0.33 | 0.35 | 0.26 |
| Oxide film thickness of flux-coated ball | nm | 2.7 | 2.1 | 1.6 | 2.4 |
| Surface roughness (Ra) of flux layer | μm | 1.627 | 1.480 | 1.602 | 1.885 |
| Level of difficulty in peeling off flux layer (test method ((1)) | — | No peeling was recognized | No peeling was recognized | No peeling was recognized | No peeling was recognized |
| Level of difficulty in peeling off flux layer (test method ((2)) | — | No peeling was recognized | No peeling was recognized | No peeling was recognized | No peeling was recognized |
| Wettability of the flux-coated ball (ball spread chord) | μm | 190.3 | 187.5 | 193.1 | 315.8 |
| Dispersion state of balls immediately after manufacture | — | No aggregation | No aggregation | No aggregation | No aggregation |

TABLE 4

|  |  | Example 10 | Example 11 | Example 12 |
|---|---|---|---|---|
| Core part | Ball Chord ($R_{110}$) | Solder ball (C-5) 300 μm | Solder ball (C-2) 100 μm | Solder ball (C-2) 100 μm |
| Shell part | Flux material (melting point) | Glutaric acid (95° C.) | Glutaric acid (95° C.) | Glutaric acid (95° C.) |
| Manufacturing technique | — | Dry technique | Dry technique | Dry technique |
| Chord ($R_{100}$) of flux-coated ball | μm | 302 | 101 | 101 |
| Standard deviation of chord ($R_{100}$) | μm | 0.00041 | 0.00028 | 0.00024 |
| Degree of true sphericity of flux-coated ball | — | 0.993 | 0.992 | 0.990 |
| Standard deviation of degree of true sphericity | — | 0.00208 | 0.00226 | 0.00185 |
| Thickness ($T_{120}$) of flux layer | μm | 1.00 | 0.50 | 0.50 |

TABLE 4-continued

|  |  | Example 10 | Example 11 | Example 12 |
|---|---|---|---|---|
| Content percentage occupied by shell part in flux-coated ball | % by mass | 0.39 | 0.58 | 0.49 |
| Oxide film thickness of flux-coated ball | nm | 2.3 | 2.1 | 2.6 |
| Surface roughness (Ra) of flux layer | μm | 1.696 | 1.641 | 1.577 |
| Level of difficulty in peeling off flux layer (test method ((1)) | — | No peeling was recognized | No peeling was recognized | No peeling was recognized |
| Level of difficulty in peeling off flux layer (test method ((2)) | — | No peeling was recognized | No peeling was recognized | No peeling was recognized |
| Wettability of the flux-coated ball (ball spread chord) | μm | 571.3 | 188.3 | 194.1 |
| Dispersion state of balls immediately after manufacture | — | No aggregation | No aggregation | No aggregation |

From the results shown in Tables 2 to 4, it was confirmed that a value of the ball spread chord was large in the flux-coated balls of all of Examples 2 to 12 to which the present invention had been applied, showing that the wettability with respect to the copper plate was further improved.

In addition, in the manufacture of the flux-coated balls of Examples 2 to 12, the balls did not aggregate immediately after the manufacture in all of the examples.

In addition, the flux-coated balls of Examples 2 to 12 were manufactured by shaking and stirring the powdery flux material and the solder balls in the sealed container while heating the powdery flux material and the solder balls. As described above, it was also confirmed that the flux-coated balls of all of Examples 2 to 12 can be manufactured by the dry treatment which is a simpler method than a wet treatment.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

100: Flux-coated ball
110: Core part
120: Shell part

The invention claimed is:

1. A flux-coated ball comprising:
a core part; and
a shell part with which the core part is coated,
wherein the core part is made of a solder ball or a copper core ball,
the shell part is made of a flux layer containing at least one selected from the group consisting of an activator and a resin component,
wherein a thickness of the flux layer is 0.10 μm or more and 2.0 μm or less,
wherein the thickness of the flux layer is determined by subtracting the diameter of the core part from the diameter of the flux-coated ball and thereafter dividing the result by 2,
wherein a ball diameter of the solder ball or the copper core ball used in the core part is 30 μm or more and 295 μm or less, and wherein the flux-coated ball has an oxide film on surface of the core part, and a thickness of the oxide film measured by the following measurement method is 3 nm or less;
measurement method of oxide film thickness:
the flux-coated ball, which is a measurement sample, is ultrasonically cleaned in acetone, and then an Auger electron spectrometer is used to measure the surface of the measurement sample after ultrasonic cleaning under the following analytical conditions, and the oxide film thickness is calculated as a SiO$_2$ equivalent value;
an acceleration voltage of 10 kV,
a current value of 10 nA, and
an analysis diameter of 20 μm.

2. The flux-coated ball according to claim 1, wherein a degree of true sphericity is 0.990 or more.

3. The flux-coated ball according to claim 1, wherein the thickness of the flux layer is 0.15 μm or more and 1.5 μm or less.

4. The flux-coated ball according to claim 1, wherein a surface roughness (Ra) of the flux layer is 2.0 μm or less.

5. The flux-coated ball according to claim 1, wherein the activator includes at least an organic acid.

6. The flux-coated ball according to claim 5, wherein the organic acid is at least one selected from the group consisting of glutaric acid, diglycolic acid, malonic acid, citric acid, pimelic acid, adipic acid, and 2,2-bis(hydroxymethyl) propionic acid.

7. The flux-coated ball according to claim 1, wherein a diameter of the flux-coated ball is 30 μm or more and 300 μm or less.

8. A method for manufacturing a flux-coated ball having a core part which is made of a solder ball or a copper core ball, and having a shell part with which the core part is coated and which is made of a flux layer containing at least one selected from the group consisting of an activator and a resin component, the method comprising a dry treatment step,
wherein in the dry treatment step, a container is charged with a powdery flux material, and the solder ball or the copper core ball, thereafter, the container together with the solder ball or the copper core ball and the powdery flux material are shaken and stirred while being heated,
wherein a temperature condition for being heated is equal to or higher than a temperature that is a melting point of the powdery flux material minus 35° C., and equal to or lower than a temperature that is a melting point of the powdery flux material minus 5° C., and wherein the powdery flux material containing at least one selected from the group consisting of the activator and the resin component.

9. The method for manufacturing a flux-coated ball according to claim 8, wherein a mass ratio of the solder ball or the copper core ball to the powdery flux material is 1 to 10.

* * * * *